United States Patent [19]
Morrisroe

[11] 4,437,786
[45] Mar. 20, 1984

[54] ARTIFICIAL SEAWEED

[76] Inventor: John P. Morrisroe, 283 Park Dr., Palatine, Ill. 60067

[21] Appl. No.: 395,618

[22] Filed: Jul. 6, 1982

[51] Int. Cl.³ .............................................. E02B 3/04
[52] U.S. Cl. ........................................ 405/24; 405/17
[58] Field of Search ...................... 405/15, 21, 24, 25, 405/28, 32, 172, 17

[56] References Cited

U.S. PATENT DOCUMENTS

| | | | |
|---|---|---|---|
| 3,299,640 | 1/1967 | Nielsen | 61/3 |
| 3,540,415 | 11/1970 | Bromley | 119/3 |
| 3,559,407 | 2/1971 | Schuur | 61/3 |
| 3,590,585 | 7/1971 | De Winter | 61/3 |
| 3,726,096 | 4/1973 | Bahre | 61/37 |
| 3,793,845 | 2/1974 | Keith | 405/172 |
| 4,221,500 | 9/1980 | Garrett | 405/24 |
| 4,337,007 | 6/1982 | Smith | 405/24 |

Primary Examiner—David H. Corbin
Attorney, Agent, or Firm—Hill, Van Santen, Steadman & Simpson

[57] ABSTRACT

Artificial "seaweed" or "reefs" for installation on the bottoms of lakes or the like to build up sandbars to reclaim beaches and reclaim coastal land has elongated hollow tubes partially filled with sand, silt or other lake bottom material to lie stationary on the lake bottom in spaced side-by-side relation at a selected orientation relative to the shore line and connectd by anchor means for buoyant sheets or ribbons which will float upright in the water to trap sand and sediment for building up sandbars and reefs on the lake bottom. In one embodiment, the side-by-side hollow tubes are formed along the side edges of a wide sheet of plastics material which is slit at selected intervals and the buoyant sheets or ribbons are threaded through these slits providing a pair of upstanding buoyant legs in spaced relation. In another embodiment, the tube connected by strands or filament receiving looped ends of the buoyant sheets or ribbons in end-to-end relation. The "seaweed" or "reef" is conveniently deployed from a travelling boat or barge which fills the tubes with sand or sediment as they are lowered into the water.

15 Claims, 8 Drawing Figures

U.S. Patent   Mar. 20, 1984   Sheet 3 of 3   4,437,786
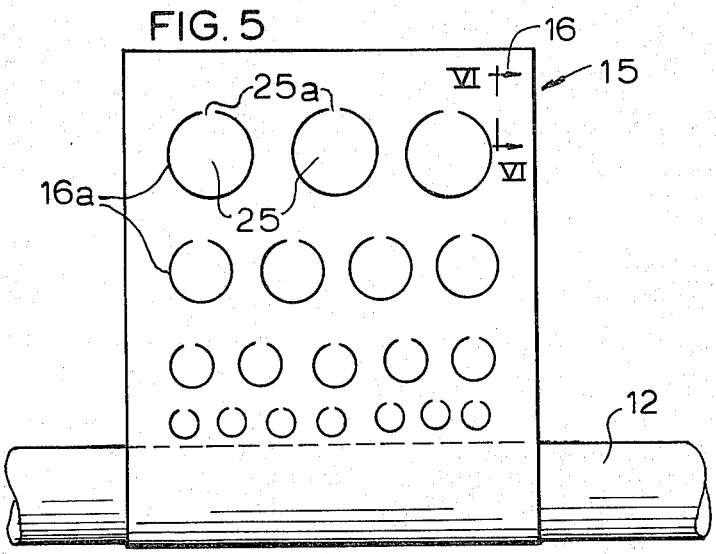
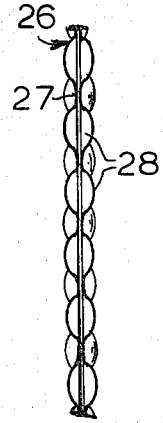
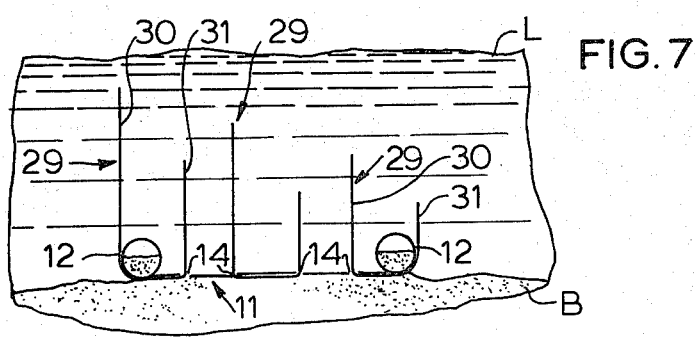
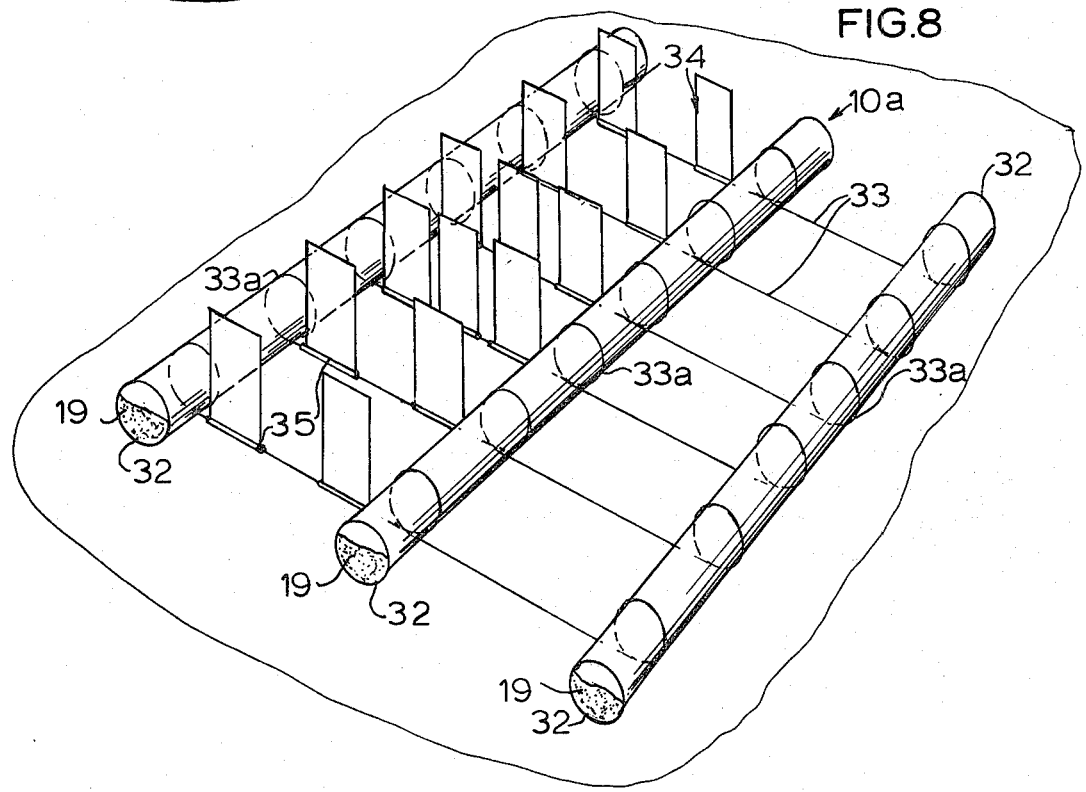

1

ARTIFICIAL SEAWEED

BACKGROUND OF THE INVENTION

1. Field of the Invention

This invention is directed to improvements in artificial seaweed to build up underwater sandbars and reefs for reclaiming beaches and coastal lands and specifically deals with artificial seaweed having elongated sand or sediment filled plastics material tubes in spaced side-by-side relation connected by anchor means for upstanding buoyant plastics material sheets or ribbons forming fingers which will float upright in the water to trap sand and sediment creating sandbars or reefs on the lake bottom.

2. Description of the Prior Art

Artificial or synthetic "seaweed" for promoting sedimentation of suspended sand, silt, and the like particulate materials in the water to build up deposits on the bed are known in the art. These artificial or synthetic "seaweed" arrangements have been expensive, difficult to deploy, and have required either an anchor for each row of upstanding 37 seaweed" fingers or have required a base mat which tends to float off of the lake bed.

It would be an improvement in the art to provide artificial seaweed with sand or sediment filled plastics material tubes in side-by-side relation providing anchors for a plurality of rows of upstanding fingers and to fill these tubes as the seaweed is being deployed into the water for resting on the lake bed or bottom.

SUMMARY OF THIS INVENTION

According to this invention, plastics material tubes are filled with lake bottom sediment, laid in the water in side-by-side relation at a selected angle relative to the shore line of the lake or other body of water and are connected by anchors for a plurality of rows of buoyant fingers to float upright in the water. In one embodiment the tubes are rolled from side edges of a wide plastics material sheet which is slit at intervals in rows between the tubular edges with the buoyant fingers threaded through adjoining slits to provide buoyant legs for floating upright in the water. The tubes are filled with lake bed material and the single sheet may extend for any distance to form an elongated anchor for a plurality of rows of fingers. The sheet is deployed to lie generally parallel with the shore line at a distance therefrom where the sandbars or reefs are to be formed and as the sediment is trapped by the fingers, the bottom sheet and its tubular sides are gradually covered to build up the sandbar. The sand or sediment filled tubes, however, firmly anchor the plural rows of fingers at the start of the operation when the sheet is uncovered.

In another form of the invention, the sediment filled tubes are deployed at an angle to the shore line in spaced side-by-side relation and are connected by a plurality of rows of filament which can be wire, ropes, monofilament plastic stands and the like. The buoyant fingers are threaded on these strands in end-to-end relation between the tubes with the tubes also providing anchors for a plurality of rows of fingers. The tubes have a diameter of from 8 to 12 inches, preferably 10 inches, and are spaced apart about 8 to 10, preferably 9 feet. In the single sheet embodiment, the length can be as long as desired to form the sandbar with lengths of from 50 to 100 feet being convenient.

In the filament connected tube embodiment, the tubes may be as long as desired and are spaced apart from 8 to 12, preferably 9, feet. Thirty feet lengths can be conveniently handled.

Five to ten rows of fingers can conveniently be provided between the tubes. With single tube installations, two rows of fingers can be provided, one on each side of the tube.

The fingers are preferably buoyant sheets of plastics material to extend upright in the water for any desired height, preferably terminating below the water line. Heights from 2 to 15 feet are convenient. The sheets may be from 2 to 6, preferably 4, feet wide and are formed of plastics material having a lower specific gravity than water so as to float and undulate in the water. The sheets can be formed of "bubble" type plastics material and can have holes at intervals therethrough. These holes can be provided with flaps that will open and close in response to currents in the water to assist the trapping of sediment.

Many suitable tough water resistant plastics materials are available for the anchor and finger sheets and tubes. Polyethylene and polyurethane sheets are available and relatively inexpensive. The base tube forming sheets can be heavier and formed of a high density plastics material while the finger sheets can be thinner and, of course, must be sufficiently buoyant to float upright in the water. Suitable plastics material sheets are available from a number of suppliers under different trademarks, such as Du Pont de Nemours Company, Wilmington, Del., "Tyvek" and "Typar"; Phillips Petroleum Company, Greenville, S.C., "Petromat" and "Supoc"; A.D.E. Corporation, Chicago, Ill., "Muscel" and "Nescel". These sheets have a specific gravity of about 0.92.

It is then an object of this invention to provide artificial "seaweed" which is easily deployed in the water, and anchored by sand or sediment filled tubes carrying supports for a plurality of rows of buoyant fingers.

Another object of this invention is to provide devices for combating erosion in waterways with buoyant fingers anchored between spaced adjacent sand filled plastics material tubes.

A specific object of the invention is to provide a sandbar building device having a sheet of plastics material with tubular sides that are filled with sand and a plurality of buoyant fingers threaded through slits in the sheet.

Another specific object of this invention is to provide artificial seaweed having filament connected spaced parallel sand filled tubes with buoyant fingers anchored in end-to-end relation between the tubes on the filaments.

A further object of the invention is to provide a method of deploying artificial seaweed including the filling of plastics material tubes with lake bottom material as they are lowered into the water.

Another specific object of this invention is to provide a method of unreeling a plastics sheet from a floating platform, forming the side edges of the sheet into tubes, filling the tubes with sand as they are lowered into the water and threading buoyant fingers through the sheet.

Other and further objects of this invention will become apparent to those skilled in this art from the following detailed description of the annexed sheets of drawings which show two preferred embodiments of the invention.

ON THE DRAWINGS

FIG. 5 is a face view of a finger or buoyant sheet of the seaweed with flap closed holes therethrough.

FIG. 6 is an edge view of a buoyant sheet of "bubble" type plastics material.

FIG. 7 is a transverse sectional view showing the manner in which sheets of FIGS. 5 and 6 can be threaded through the anchor sheet to provide fingers of unequal length.

FIG. 8 is a perspective view of a modified embodiment of seaweed according to this invention.

BRIEF DESCRIPTION OF ILLUSTRATED PREFERRED EMBODIMENTS

Figure 1:
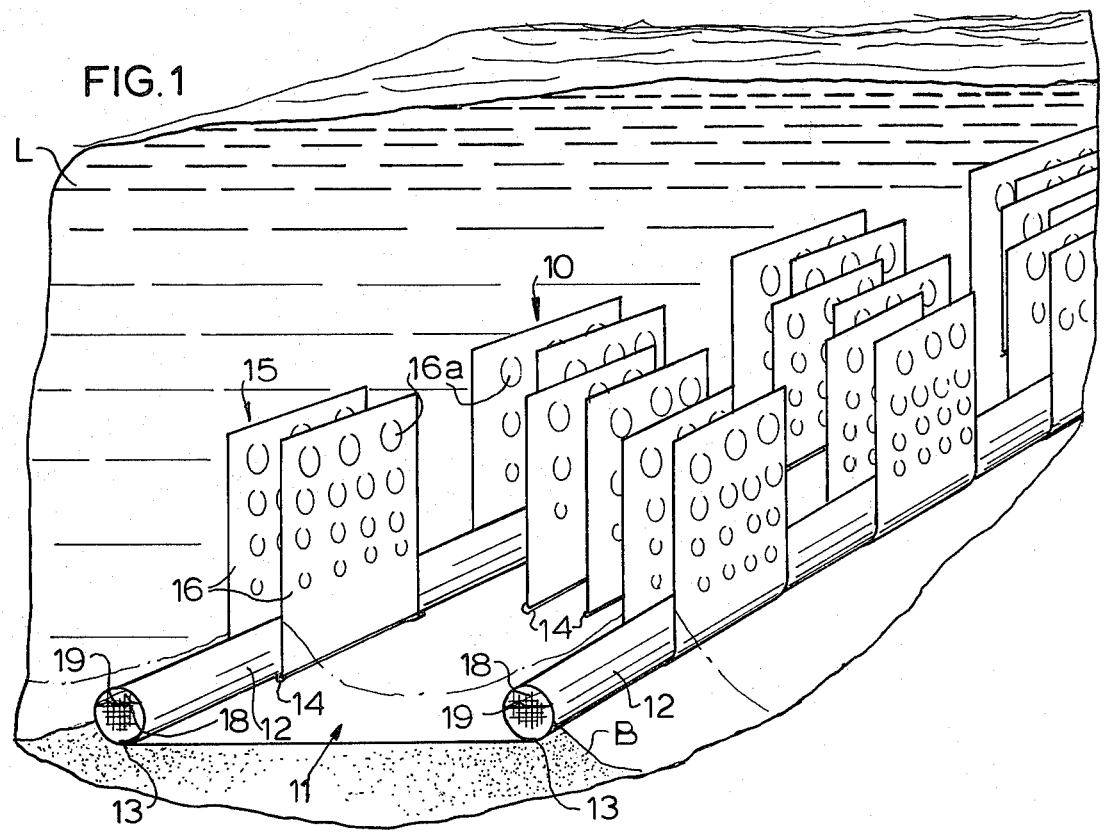
FIG. 1 is a pictoral perspective view of artificial seaweed according to this invention mounted in position on a lake bed.
Figure 2:
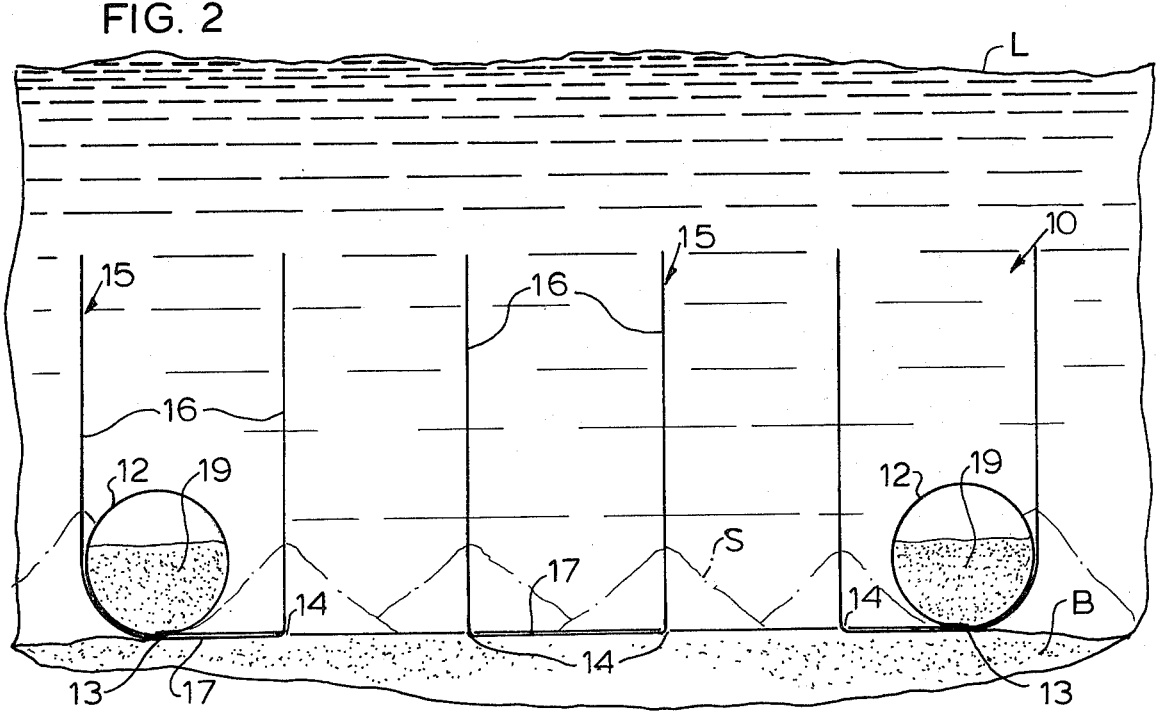
FIG. 2 is a transverse sectional view through the artificial seaweed of FIG. 1.
Figure 3:
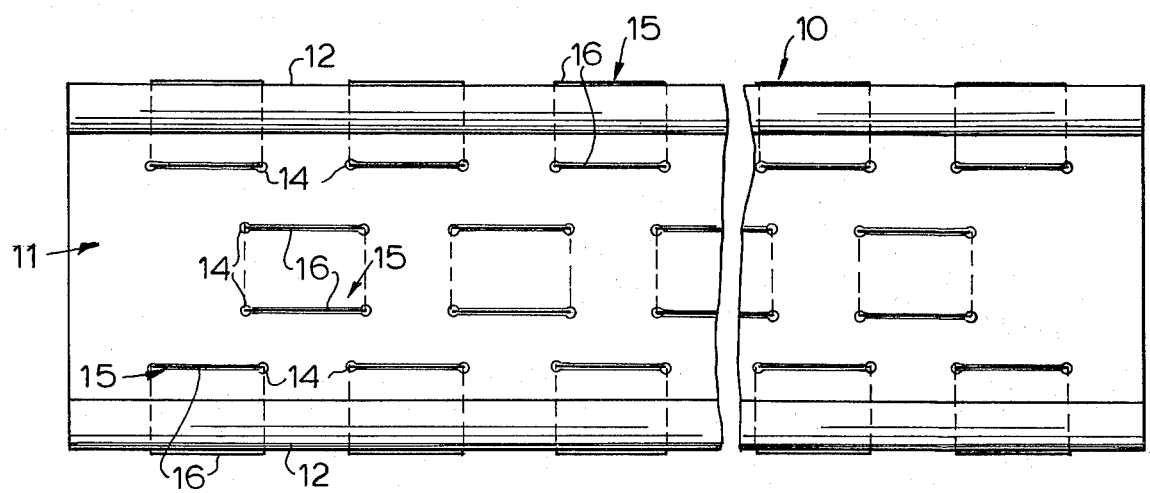
FIG. 3 is a top plan view of the artificial seaweed of FIGS. 1 and 2.

The seaweed 10 of FIGS. 1 to 4 is composed of a tough plastics material base sheet 11 with tubular sides 12, 12 formed by rolling the side edges of the sheet into cylindrical shape and cementing or heat sealing the end edges 13 to the top face of the sheet 11 to provide hollow cylinders. The sheet 11 has longitudinal slits or cuts 14 along the length thereof formed in spaced parallel rows between the tubular sides 13. The slits 14 are formed in adjacent pairs which, as shown in FIG. 3, are staggered so that one pair of rows straddles the gaps between the pairs of adjacent slits.

Buoyant sheets 15 of plastics material are threaded through the slits with each sheet having upstanding legs 16 projecting through the slits of each pair and a bottom bight portion 17 underlying the sheet 11. The legs 16 have holes 16a therethrough preferably arranged in parallel rows and decreasing in size from the tops to the bottoms of the legs.

In a preferred form, only the portion of the sheet 11 between the tubular sides 12 have the slits 14 arranged in adjacent pairs with single outboard slits 14 adjacent the cylindrical tubes 12 so that only one leg 16 of a sheet 14 is threaded through an outboard slit 16 and the other leg is wrapped around the tube 12. This arrangement provides rows of outboard sheets 15 in longitudinally spaced relation along the tubular sides of the base sheet 11 with one leg 16 rising from the outer face of the tube 12 with the other leg rising through a slit 14 in the flat portion of the sheet 11. Central rows of slits 14 are then arranged in pairs so that each sheet 15 is threaded through a slit of each pair to have the legs 16 rise from the central portion of the base sheet 11.

It will be understood that many variations of slit spacings and positions can be provided in the base sheet 11 to mount a plurality of rows of upstanding legs 16 which form the buoyant undulating fingers of the seaweed. As shown in FIG. 3, for example, two rows of upstanding fingers are provided at spaced intervals along the cylindrical or tubular sides 12 of the base sheet while two rows of upstanding fingers are provided between these outboard rows. The intermediate rows of fingers are staggered to overlap the gaps between the outboard rows. In some installations, only a single tube may be provided with the sheets 15 wrapped around the tube as at the outboard position and thus providing only two rows of legs 16, one on each side of the tube. Plural rows of legs can thus be provided on each tube and the sheets can be fastened to the tube by bonding, stitching, or the like.

The leading ends of the tubes 12 are coupled with an open mesh basket 18 capable of freely discharging water. Then the tubes are partially filled with sand or lake bed sediment as indicated at 19 which can be pumped as a slurry through the tubes to discharge the water through the baskets allowing the solid sand material to settle to the bottoms of the tubes. The sand or sediment filled tubes will sink to the bottom or bed B of a lake L or other body of water and are deployed in parallel relation to hold taut against the bed B that portion of the sheet 11 between the tubular sides. The sheet 11 thus becomes an anchor weighted down on the lake bed B with the buoyant sheets 15 having their side legs 16 rising upward from the anchor in spaced parallel rows along the entire length of the base sheet which can be as long as is required for the particular reclamation project.

The weighted down base sheet 11 and the tubular sides thereof soon become embedded in sand or sediment S deposited from the water by the buoyant legs 16 of the sheets 15 which trap the particulate matter in the water. A sandbar or a plurality of ridges is soon built up on the lake bed B.

As shown in FIGS. 1 and 2, the tops of the legs 16 terminate below the surface of the lake and are free to sway with the current and waves. The holes 16a through these legs 16 facilitate movement of the water while trapping the suspended particulate material.

Figure 4:
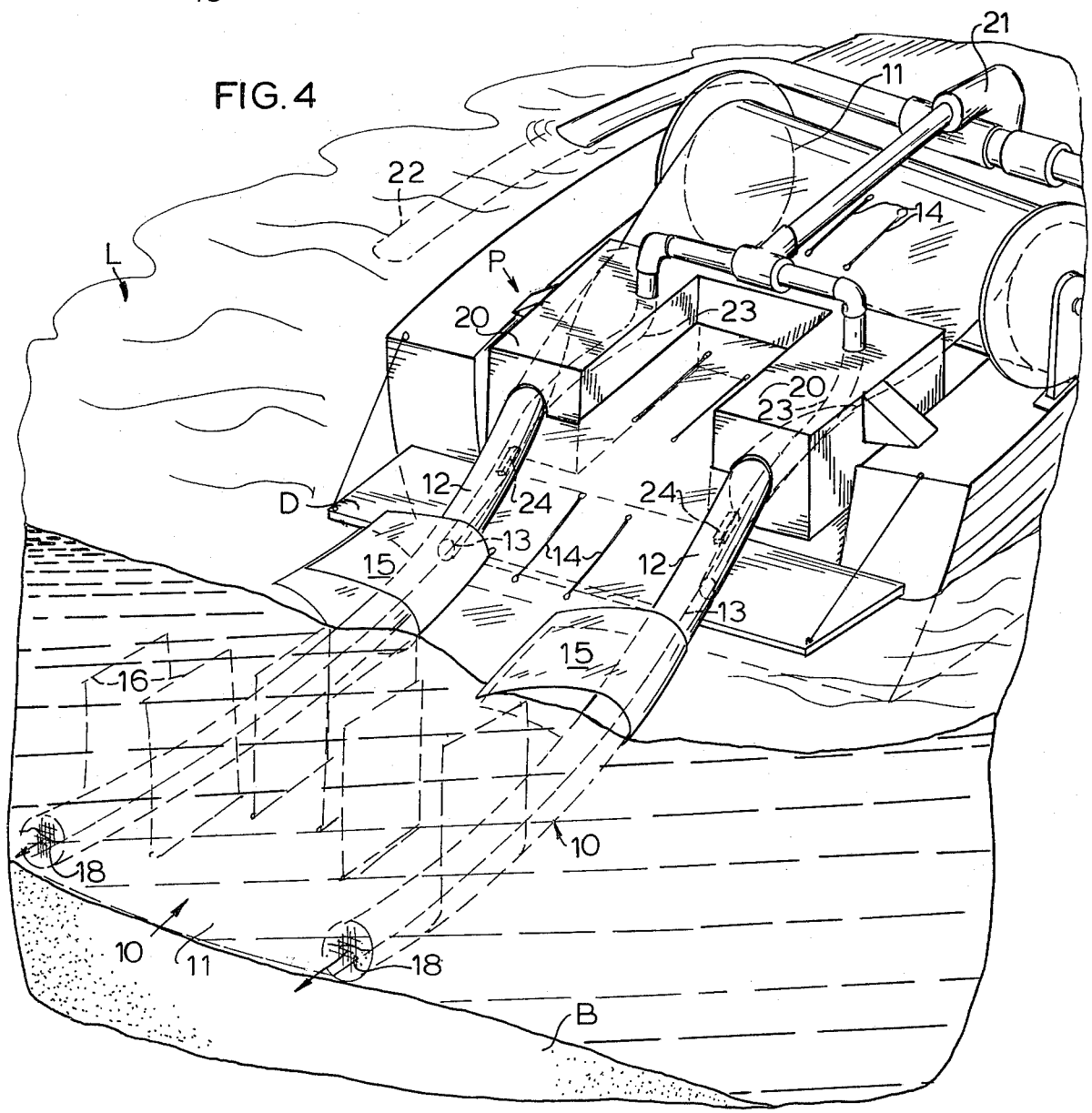
FIG. 4 is a pictoral perspective view showing the manner in which the seaweed of FIGS. 1 to 3 is deployed into the water from a floating platform.

As shown in FIG. 4, the seaweed 10 can be deployed into the lake L from a floating platform or barge P carrying a reel of wound base sheet 11 with the longitudinal slits 14 as described above. The sheet is unwound from the reel with its side edges passed through forming shoes 20 to curl the sides into the cylindrical tubes 12 and then heat seal the edges to form the seam 13.

A pump 21 on the platform P draws a slurry of sand or lake bed sediment from the lake bed B through a suction hose 22 discharging the slurry through hoses 23 into the tube forming shoes 20 in advance of the heat sealing stations 24 to discharge the slurry into the cylindrical tubes as they are formed. This slurry then flows through the tubes to discharge the water out of the basket ends 18 while settling the sand or other sediment to weight down the tubes on the lake bed B.

The sheets 15 are manually threaded through the slits 14 as the seaweed base with its tubular sides is fed over a work deck D on the back end of the platform P. If desired, the central sheets 15 could be threaded through the slits 14 before reeling the base sheet 11.

From the showing in FIG. 4, it will be understood that the seawood 10 can be formed as it is deployed from a floating platform that advances as the seaweed sinks to the lake bed.

Instead of providing open holes 16a through the legs or fingers 16 of the sheets 15, as shown in FIG. 5, flaps 25 can be provided in each hole 16a. These flaps are, of course, formed of the sheet material 15 and are provided by terminating the circumference of each hole providing a hinge connection 25a with the sheet.

As shown in FIG. 6, the finger sheets 15 could be formed from "bubble" type plastic sheets 26 with the floating upright legs 27 having bubbles or sealed hollow expansions 28 rendering the fingers very buoyant to float and undulate in the water.

As shown in FIG. 7, the legs of the buoyant sheet can be of unequal heights. Thus, buoyant sheets 29 can be threaded through the slits 14 and wrapped around the tubular sides 12 of the base sheet 11 as described above to provide long or high legs 30 and short or low legs 31. The heights of the legs can be adjusted as desired when the sheets 29 are threaded through the slits.

In the modified "seaweed" 10a of FIG. 8, plastics material tubes 32, instead of being formed on the side of a base sheet 11 as described hereinabove, can be independently formed, filled with sand or sediment 19 as they are deployed on the bed of the lake in spaced side-by-side relation. The tubes 32 anchor spaced parallel strands 33 to lie on the lake bed. These stands are wrapped around the tubes as shown at 33a and have their free ends twisted together so that the loops 33a tightly embrace the tubes holding the strands 33 in fixed relation.

Buoyant plastics material sheets 34 of the same type as described above have tubular bottom ends 35 threaded on the strands 33 between the tubes 32 thus providing a plurality of rows of upstanding fingers or legs between the tubes. Any desired pattern of fingers can be provided with fingers in some of the rows staggered relative to the fingers in adjacent rows.

From the above descriptions, it will therefore be apparent that this invention provides artificial "seaweed" which is easily formed and deployed, has sand or slit filled flexible material, preferably plastic, tubes anchoring on a lake bed supports for upstanding buoyant fingers or legs which would float upright in the water trapping sand and sediment to deposit on the underlying lake bed for building up sandbars to reclaim beaches and prevent erosion of shorelines.

It will be apparent to those skilled in the art that many modifications and variations may be effected without departing from the spirit and scope of the novel concepts of the present invention.

I claim as my invention:

1. Artificial seaweed for deployment on lake bed bottoms and the like to build thereon deposits from particulate material suspended in the water which comprises an anchor having a plurality of elongated flexible particulate material receiving tubes positioned in laterally spaced side-by-side relation, means spanning the spaced tubes connected thereto along the length thereof and arranged to be held taut against the lake bottom when the tubes are deployed, and a plurality of rows of buoyant fingers anchored at their bottom ends to said means and having free upper ends for rising in the water to levels below the surface thereof, and said fingers being spaced apart in a plurality of rows exposing the surfaces of the fingers to the water for trapping suspended particulate material to build up said deposits on the bottom.

2. In a body of water having a bottom bed of particulate material, artificial seaweed deployed in said body which comprises a pair of elongated plastics material flexible tubes filled with particulate material and resting on said bed in laterally spaced relation, means spanning the spaced tubes connected thereto along the lengths thereof and forming a fixed anchor at the bottom of said body, a plurality of buoyant plastics material sheets having bottom ends affixed to said anchor and rising in the body to free ends at levels below the surface of the body, and said sheets being spaced apart lengthwise of the tubes and facing each other in side-by-side relation to trap particulate matter suspended in the body and deposit the same on the bottom bed.

3. Artificial seaweed for use in inhibiting lake erosion and the like which comprises a base sheet of flexible plastics material having rolled sides along the length thereof forming tubes with mouths for receiving lake bed material to anchor the base sheet on the bottom of a lake bed spanning the space between the tubes, said base sheet having a plurality of elongated slits arranged in adjacent pairs across the width and along the length of the base sheet, and buoyant finger sheets threaded through the adjacent pairs of slits forming upstanding pairs of legs facing each other along the lengths of the slits positioned and sized to float upright in the water below the surface thereof to trap and deposit particulate material and deposit the same on the underlying lake bed.

4. Artificial seaweed for deployment in a body of water having a bottom bed of particulate material which comprises a pair of laterally spaced elongated flexible tubes, mouths on the ends of the tubes for receiving particulate material from the bottom bed to anchor the tubes on the bottom bed, a plurality of strands spanning the space between the tubes anchored at spaced intervals to the tubes along the length thereof providing a plurality of spaced transverse rows held taut by the tubes adjacent the bottom bed, and a plurality of buoyant flexible sheets having bottom ends attached to the strands in spaced relation and sized to rise from the strands to levels below the water surface.

5. The method of deploying artificial seaweed on the bottom of a lake bed which comprises advancing a floating platform over the lake bed, unreeling wide flexible anchor sheet material from the platform, curling both side edges of the sheet into tubular form as it is unreeled, sealing the curled edges to form cylindrical tubes on both sides of the sheet, pumping lake bed sediment into the tubes, deploying the sheet and tubes from the platform to the lake bed as the tubes are filled with sediment, and anchoring upstanding buoyant fingers on the sheet to rise in the water for trapping sediment.

6. The artificial seaweed of claim 1 wherein the tubes are curled sides of a single sheet extending the full length of the sheet and effective to hold the sheet against the lake bed bottom when filled with lake bed material.

7. The artificial seaweed of claim 6 wherein the sheet has slits therethrough and the upstanding buoyant sheets are threaded through said slits.

8. The artificial seaweed of claim 1 wherein the buoyant sheets are spaced longitudinally along the length of the tubes.

9. The artificial seaweed of claim 2 wherein some of the sheets are wrapped around the tubes providing a pair of adjacent legs straddling the tubes.

10. The artificial seaweed of claim 1 wherein the fingers have substantial width and have holes therethrough.

11. The artificial seaweed of claim 10 wherein fingers have flaps adapted to close the holes.

12. The artificial seaweed of claim 3 wherein the finger sheets are threaded downwardly through one slit of each pair, under the base sheet and upwardly through the other slit of the pair.

13. The artificial seaweed of claim 3 wherein the mouths at one end of the tubes are covered with sieves accommodating flow of water out of the tubes while retaining the lake bed material.

14. The method of claim 5 including the step of placing sieves over the leading ends of the tubes to accommodate flow of water through the tubes while retaining the sediment in the tubes.

15. The method of claim 5 wherein the buoyant fingers are anchored to the sheet by providing slits in the sheet and threading the fingers through the slits.

* * * * *